United States Patent
Drumm et al.

(10) Patent No.: US 10,521,550 B2
(45) Date of Patent: Dec. 31, 2019

(54) PLANNING AND ENGINEERING METHOD, SOFTWARE TOOL AND SIMULATION TOOL FOR AN AUTOMATION SOLUTION

(71) Applicant: Siemens Aktiengesellschaft, Munich (DE)

(72) Inventors: Oliver Drumm, Eggenstein-Leopoldshafen (DE); Benjamin Lutz, Pfinztal (DE); Anna Palmin, Karlsruhe (DE); Gerrit Wolf, Karsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 370 days.

(21) Appl. No.: 15/083,525

(22) Filed: Mar. 29, 2016

(65) Prior Publication Data
US 2016/0300001 A1    Oct. 13, 2016

(30) Foreign Application Priority Data

Apr. 8, 2015  (EP) .................................... 15162825

(51) Int. Cl.
*G06F 17/50* (2006.01)
*G05B 17/02* (2006.01)
(Continued)

(52) U.S. Cl.
CPC ........... *G06F 17/509* (2013.01); *G05B 17/02* (2013.01); *G05B 19/41885* (2013.01);
(Continued)

(58) Field of Classification Search
CPC . G05B 13/04; H04L 63/1425; H04L 63/1433; G06Q 50/00; G06Q 10/06
See application file for complete search history.

(56) References Cited

U.S. PATENT DOCUMENTS

2009/0006467 A1* 1/2009 Visscher ................ G06Q 10/06
2009/0292514 A1   11/2009 McKim et al.
(Continued)

FOREIGN PATENT DOCUMENTS

CN    101978405    2/2011
CN    103618735    3/2014
(Continued)

OTHER PUBLICATIONS

Office Action dated Mar. 15, 2018 which issued in the corresponding Chinese Patent Application No. 201610154359.3.
(Continued)

*Primary Examiner* — Kandasamy Thangavelu
(74) *Attorney, Agent, or Firm* — Cozen O'Connor

(57) ABSTRACT

In planning and engineering an automation solution which comprises an automation system and a process engineering plant, objects that represent the components of the configured automation solution are imported by means of a simulation tool to simulate the automation solution on the basis of simulation models associated with the imported objects. Attributes contained in objects which represent the hardware components of the automation system and which describe IT security events that may be generated by the components are entered into the associated simulation models for simulatively generating security events in a simulation of the automation solution, for transferring the simulatively generated security events to a Security Information Event Management (SIEM) system for evaluation, and for using the results of the evaluation generated by the SIEM system to simulate the automation solution.

9 Claims, 2 Drawing Sheets

(51) Int. Cl.
   *G05B 19/418* (2006.01)
   *H04L 29/06* (2006.01)
   *G06F 21/55* (2013.01)

(52) U.S. Cl.
   CPC ........ *G06F 17/5009* (2013.01); *G06F 21/552* (2013.01); *H04L 63/1433* (2013.01); *H04L 63/20* (2013.01); *G05B 2219/32339* (2013.01); *Y02P 90/20* (2015.11); *Y02P 90/26* (2015.11)

(56) References Cited

U.S. PATENT DOCUMENTS

| | | | |
|---|---|---|---|
| 2011/0039237 A1 | 2/2011 | Skare | |
| 2012/0191439 A1* | 7/2012 | Meagher | G06Q 50/00 703/18 |
| 2012/0224057 A1 | 9/2012 | Gill | |
| 2013/0104236 A1* | 4/2013 | Ray | H04L 63/1433 726/25 |
| 2013/0283336 A1 | 10/2013 | Macy et al. | |
| 2015/0341379 A1* | 11/2015 | Lefebvre | H04L 63/1425 726/22 |
| 2016/0274978 A1* | 9/2016 | Strohnnenger; John | G05B 13/04 |

FOREIGN PATENT DOCUMENTS

| | | |
|---|---|---|
| EP | 2279465 B1 | 4/2011 |
| WO | WO 2013/160765 A3 | 7/2014 |

OTHER PUBLICATIONS

Andrew Davis: "Developing Scada Simulations with C2Windtunnel"; Master Thesis; XP055229908; found in Internet URL:http://etd.library.vanderbilt.edu/available/etd-04052011-071956/unrestricted/edt.pdf; 2011. p. 1-p. 6; p. 12-p. 16; p. 33-p. 42; p. 50.

Rohan Chabukswar et al.: "Simulation of Network Attacks on SCADA Systems"; First Workshop on Secure Control Systems; XP055228970; found in Internet: Url:http://mr-modi.chabukswar.in/projects/scspresentation.pdf; 2010. The whole document.

Office Action dated Jan. 8, 2019 issued in Chinese Patent Application No. 201610154359.3.

Office Action dated Jul. 3, 2019 issued in Chinese Patent Application No. 201610154359.3.

* cited by examiner

PLANNING AND ENGINEERING METHOD, SOFTWARE TOOL AND SIMULATION TOOL FOR AN AUTOMATION SOLUTION

FIELD OF THE INVENTION

The present invention relates to a planning and engineering method for an automation solution which comprises an automation system and a process engineering plant, wherein when designing and configuring the automation solution objects that are created and linked by means of an engineering tool and which represent operable and observable components of the plant and hardware components of the automation system are imported by a simulation tool and the automation solution is simulated using simulation models that are associated with the imported objects.

BACKGROUND OF THE INVENTION

The function of automation technology is to automate technical processes. Broadly, an automated system consists of a technical system (plant) in which the process runs, an automation process, and operating personnel. The automated process may, by way of illustrative example, be a processing or manufacturing technology process or a process for generating or distributing electrical energy.

To plan and configure an automation solution the structure of the plant is, in a first step, normally recorded in a planning and engineering system by means of a corresponding software tool, and a flow diagram of the plant is then generated by linking graphical process objects using a plant planning tool. The process objects represent the operable and observable apparatus or devices of the plant, such for example as sensors, motors, pumps, valves, dosing equipment and controllers. Then, likewise using graphical objects, the hardware components of the automation system—such for example as automation devices (controllers), communication components, input/output modules and field devices—and the communication relationships between these components are configured and parameterized.

The graphical objects are typically contained in libraries as standard modules and are positioned and linked to one another by way of suitable editors on configuration interfaces in accordance with technological or automation technology considerations.

To establish whether this engineering of the automation solution has been successful, or to optimize it, test conditions can be predefined in a separate test tool and a simulation of the automation solution can be performed in a simulation tool under the predefined test conditions. In this manner the automation solution is emulated virtually in a simulated environment either wholly or partially by simulation models of the objects involved. The simulation tool generates signals for possible events and scenarios that may occur during operation of the plant. Such a simulation tool is known for example under the name SIMIT from Siemens AG.

The tools mentioned for plant planning, engineering, testing and simulation may be embodied individually or in combination.

Industrial automation systems have increasingly developed from originally proprietary, isolated systems into open architectures and standard technologies. As a consequence, the automation of processes in industrial plants also represents an IT (information technology) complex and infrastructure that is critical to security and is under increased susceptibility to cyber-attacks.

The future standard ISA99/IEC 62443 is concerned with the IT security of so-called "Industrial Automation and Control Systems" (IACS). The term IACS encompasses all components that are necessary for the reliable and fail-safe operation of an automated production plant. This firstly includes the networked hardware components of the automation solution such as, for example, controllers, firewalls, gateways, switches, SCADA systems or PC-based stations. A second aspect of IACS includes the organizational processes for fail-safe operation of the plant; these include process operation, internal chains of responsibility and escalation processes, as well as training for fail-safe operation.

A major contribution to the comprehensive protection of automation components, systems and plants against unauthorized access is provided not only by typical protection mechanisms such as firewalls or virtual private networks (VPN), but also by tools for proactive identification of attacks and other security-related deviations from a normal state or behavior, such for example as so-called SIEM (Security Information Event Management) systems.

A SIEM system generally unites the following two basic functionalities:

Security Event Management (SEM) collects security events in real time, evaluates them using correlations, and displays them in a structured manner on a SIEM console in a dashboard. The purpose of the evaluation is to identify, from individual events or from a pattern of multiple events, whether there is any indication of an attack or violation of the data security policies implemented in a plant. If any such indication is identified, then an alarm is generated and reported via the network or via other communication channels such as email or SMS to a suitable point, as for example an operator station.

Security Information Management (SIM) serves for the long-term archiving of captured security events, in order to enable a subsequent analysis, and for generating reports for use in demonstrating compliance with security guidelines and regulatory requirements.

The creation of correlation rules in a SIEM system deployed in an automation plant depends heavily on the plant-specific network topology (including network segmentation and the communication relationships between individual components of the automation system) and the security events that may be generated in each case by the components deployed. This relates to very complex systems of rules and events, the behavior and effects of which on the overall behavior of the plant are not easy to predict. The cost of implementation is very high and testing for full functionality and coverage is not easy to achieve.

Individual commercial SIEM systems contain the functionality, in response to an identified security risk or a threat (e.g. a brute force attack or an impermissible CPU protection level change) or to an alarm as mentioned above, for performing further actions such as executing a batch file that may for example close a port or changing the configuration of a component of the automation system.

When deploying a SIEM system in an industrial plant, the active use of such extended functionality is however generally dispensed with, because the action triggered by the SIEM system can negatively impact the normal operation of the plant and could possibly result in endangering the process and/or human lives. In contrast, the residual alarm function leaves the plant operator, administrator or IT specialist the decision on a reasonable response to the current security issue. Yet because of the complexities involved, suitable actions of the plant operator and the resulting behavior of the plant cannot be determined and optimized until the plant is in operation. The danger then is that errors in the planned code of practice for response to critical security incidents cannot be identified or inappropriate actions by operating personnel cannot be prevented. There are quite simply insufficient opportunities for testing of the system in the context of the overall plant and plant management.

Published US Patent Application 2012/224057 discloses an alert enterprise system with a correlation engine, in which support of the convergence of information security is provided by access control and industrial control that communicates with a plurality of different systems and sources of technical and non-technical data and processes security-related data and information obtained therefrom for the purposes of identifying, evaluating and minimizing threats and risks and complying with and examining regulatory provisions. An alert enterprise simulation engine enables simulations and statistical analyses in order to identify, evaluate and minimize risks proactively.

The publication of A. Davis, "Developing SCADA Simulations with C2WindTunnel", Master's Thesis, Vanderbilt University, Nashville, Tenn., May 1, 2011 (available on the Internet at http://etd.library.vanderbilt.edu/available/etd-04052011-071956/unrestricted/edt.pdf), describes the simulation of a SCADA system for monitoring and controlling a technical process. Because of the complexity of the SCADA system to be modeled and simulated, which includes the process to be controlled, field devices, a central controller and a network linking the field devices and the controller to one another, the simulation is performed on the basis of High-Level Architecture (HLA), in which the overall simulation, designated as a federation, is split into a plurality of distributed individual simulations, known as federates. The exchange of information between the individual simulations is coordinated and administered by the so-called runtime infrastructure (RTI). The individual simulations can be created by means of various suitable software tools or frameworks such as Simulink/MATLAB for the technical process and the controller or OMNeT++ for the network. A software platform called C2WindTunnel is used to coordinate the heterogeneous individual simulations and to generate the overall simulation. The C2WindTunnel platform uses the so-called Generic Modeling Environment (GME), a toolset for designing domain-specific models. To simulate a network attack, an attacker is added during the generation of the individual simulation(s) for the network, so that the attack and its effects on the SCADA system can be simulated in the context of the overall simulation.

A summary presentation can be found in Rohan Chabukswar et al, "Simulation of Network Attacks on SCADA Systems", First Workshop on Secure Control Systems, CPSWeek, Stockholm, Sweden, Apr. 12, 2010 (available on the Internet at http://truststc.org/conferences/10/CPSWeek/presentations/Rohan%/20Chabukswar.pdf).

SUMMARY OF THE INVENTION

It is accordingly the object of the invention to enable plant-specific actions from a SIEM system in response to identified plant-specific deviations from a normal status or behavior, without thereby negatively impacting the normal operation of the plant. This and related objectives are achieved by a planning and engineering method, a planning and engineering software tool, a simulation tool, and a planning and engineering system, all in accordance with the present invention and as described and disclosed herein.

In the planning and engineering method of the invention, attributes that are contained in the objects representing the hardware components of the automation system and which describe security events that can be generated by the hardware components are taken over into the associated simulation models of the simulation tool. Using the simulation models associated with the imported objects of the hardware components, security events are simulatively generated and are transferred for evaluation to a SIEM system. Results of the evaluation generated by the SIEM system are used by the simulation tool to simulate the automation solution.

By extending the simulation models with the facility to generate security events simulatively, and by coupling the simulation tool to a SIEM system evaluating security events on the basis of SIEM correlation rules, it is for the first time possible in accordance with the invention to test and verify the security events, SIEM correlation rules and the effects thereof—in other words, for example, to check or verify whether the security events implemented in the engineering are also actually reported.

The SIEM correlation rules can be advantageously configured by means of an engineering tool and transferred into the SIEM system. Together with the objects that represent the operable and observable components of the plant and hardware components of the automation system, the properties and parameters of these components are stored in libraries of the engineering tool. Also belonging to the parameters are the security events that can be generated by the hardware components and which are described by attributes. When designing and configuring the automation solution, the library is accessed; the required components are selected and imported into the planning project, wherein the associated security events are also automatically created in the planning project. Plant-specific SIEM correlation rules can then be designed for the planning project, based on the security events that can be generated by the configured components. Graphical methods may be used to generate the SIEM correlation rules on the model of a flow diagram consisting of steps and transitions. If a security event occurs, a transition is executed and a new step is reached, in which by way of example a new security event can be generated, which in turn is used in the SIEM correlation rules. By modeling the correlation rules using a procedure description it is also possible to describe, for example, sequential events. In the event of changes in plant planning, such as the omission of a component, effects on the security events and on the SIEM correlation rules can be readily determined. The configuration of SIEM correlation rules is therefore integrated into the configuration of the automation solution and is thus more plant-specific and automation-specific and is more efficient than heretofore attainable.

As described above for the SIEM correlation rules, plant-specific actions can also advantageously be configured in response to identified plant-specific deviations from normal status or behavior and transferred into the SIEM system. The SIEM system is then able, in the event of an attack or a violation of the data security provisions implemented in a plant, to trigger configured actions over and above simply sounding an alarm. Coupling of the simulation tool to the SIEM system permits testing of these actions and their impact on the automation solution or, for example, their simulation in true to reality fashion to enable realistic and effective training of operating personnel.

The following advantages thus result from implementation and use of the methods and advances of the present invention:

By integrating automation solutions into the simulation, the benefits of SIEM systems are enhanced and increased, thereby aiding compliance with security requirements such as the "Security by Design" NAMUR requirement.

By simultaneously configuring actions in response to security events in the context of plant planning using a planning tool, the responses to deviations identified by a SIEM system are structured much more plant-specifically, automation-specifically and efficiently than at present.

By verifying the effectiveness of plant-specific actions in response to security events using a simulation tool and iterative adjustments as required, it is ensured that automatically triggered actions do not impact negatively on the normal operation of a plant. This therefore does away in particular with the need to coordinate and make decisions following the occurrence of security events and alarms. Furthermore, the risk of an incorrect decision is minimized.

IT security aspects which extend across several trades (process engineering, automation, electrical engineering, etc.) can be taken into account.

Training of personnel can be effected prior to commissioning and continuously during operation of the plant on an OTS system taking account of IT security aspects.

The response of the SIEM system can actively influence the control system, which was not hitherto possible for security reasons. Thanks to the simulative verification of the SIEM system, the determinacy of the plant behavior can be guaranteed.

These and other objects and features of the present invention will become apparent from the following detailed description considered in connection with the accompanying drawings. It is to be understood, however, that the drawings are designed solely for purposes of illustration and not as a definition of the limits of the invention, for which reference should be made to the appended claims.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
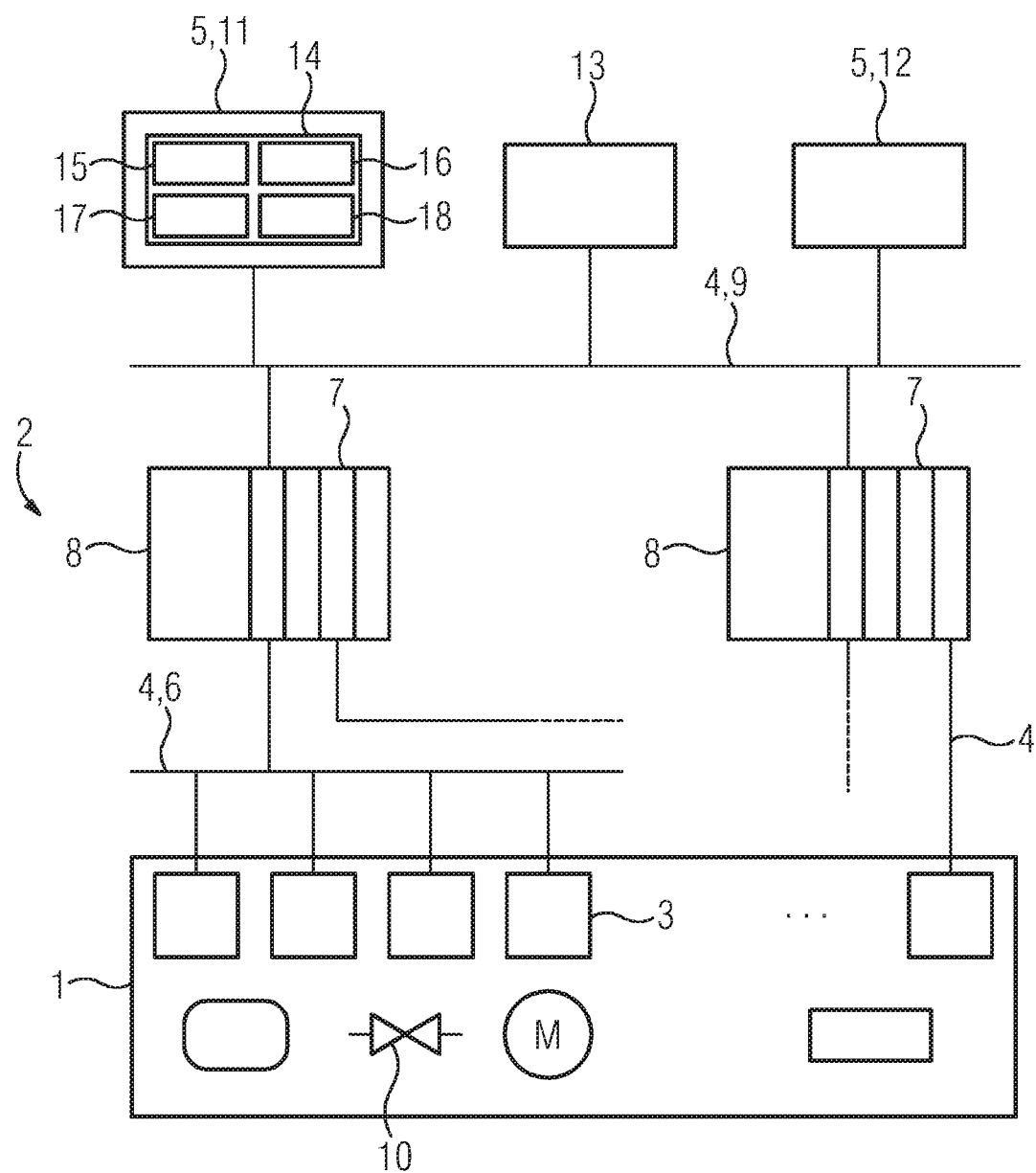
FIG. 1 is a schematic block diagram of an illustrative automation solution consisting of a process engineering plant and an associated automation system.

FIG. 1 depicts, in a simplified schematic representation and by way of illustrative example, a technical plant 1 in which a process is running under the control of an automation system 2. The automation system includes a plurality of process-oriented components (field devices) 3 which perform measurement, control and regulation functions predefined at field level, i.e. in the process, and in particular capture measured variables from the process and act on the process using control actions. The field devices 3 may by way of example be sensors, actuators, measuring transmitters, analysis devices, and drives, among others. The field devices 3 exchange process-related, function-related and/or device-related data with one another via a generally wired communication system 4 and with computer systems 5 at a control and planning level, to which end the field devices 3 are connected by (for example) a field bus 6 to input and output modules 7 of automation devices 8 (such as programmable logic controllers (PLC)) which are in turn connected individually or via a central system bus 9 to the higher-level computer systems 5.

The field devices 3, automation devices 8, input and output modules 7 and other components not shown here, such for example as communication components, represent hardware components of the automation system 2. The field devices 3 themselves, such as measuring transmitters, can also represent operable and observable components of the plant 1, to which by way of illustration valves 10, dosing equipment, scales or groups of such devices belong, that have a closer process engineering relationship to one another, such as the dryer group of a paper-making machine or the cooling section of a continuous casting plant.

The computer systems 5 include a planning and engineering system 11, an operating and observation system 12 and a SIEM system 13. The planning and engineering system 11 implements a planning and engineering software tool 14 that consists of various software tools, in this illustrative example a planning tool 15, an engineering tool 16, a simulation tool 17 and a test tool 18. In FIG. 1 the software tool 14 is depicted for enhanced clarity as a block on an engineering station. This should not, however, be understood as denoting that the software tool 14 can run on only one computing unit, as it can instead be distributed across various computing units. The software tools 15, 16, 17, 18, as well, may be implemented or configured individually or in combination.

Through operation of the plant planning tool 15 and the engineering tool 16, a flow chart of the plant is created by linking graphical process objects that represent the operable and observable devices of the plant 1. The hardware components of the automation system and their communication relationships, which are likewise represented by objects below, are configured and parameterized.

Figure 2:
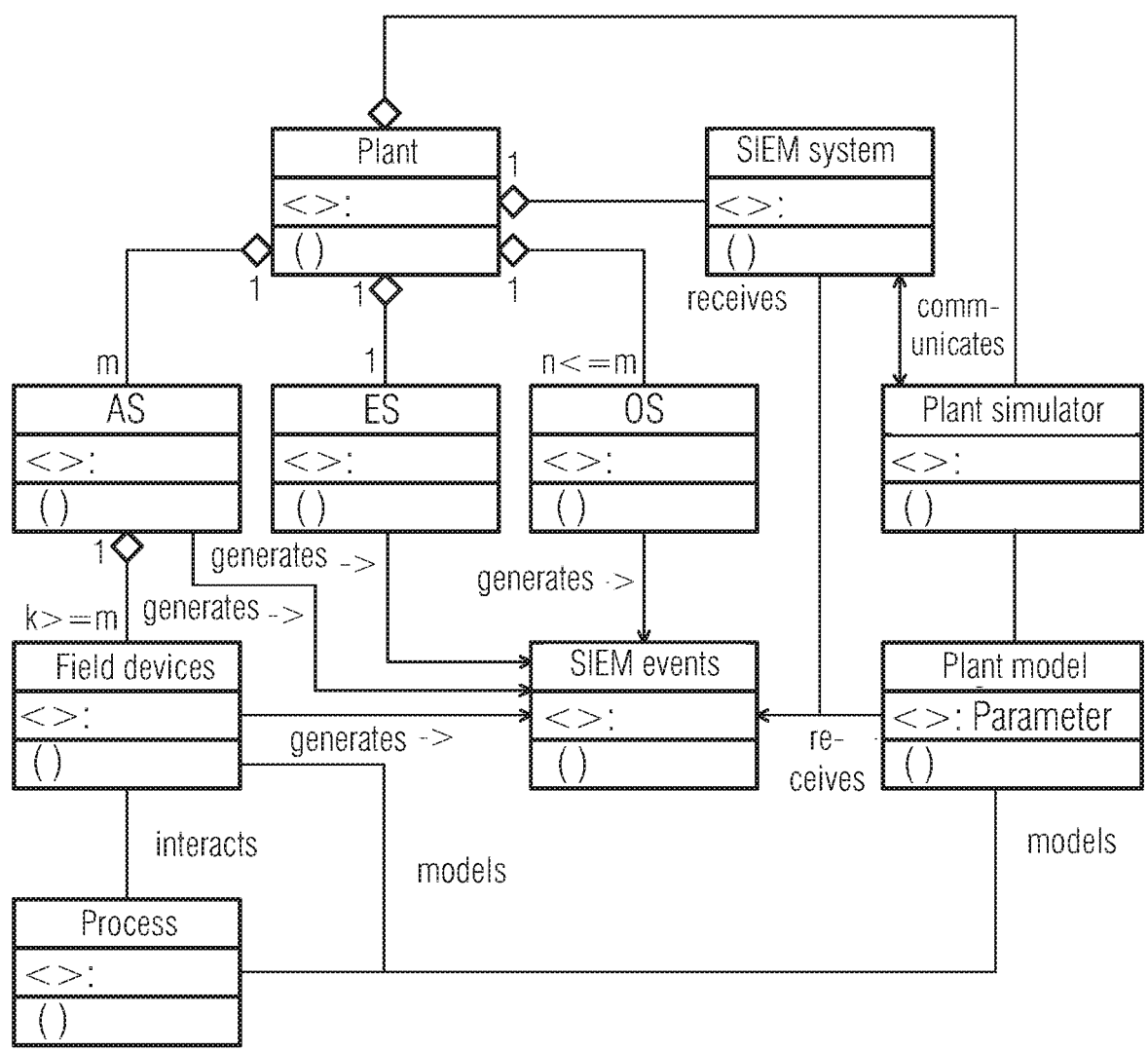
FIG. 2 is a simplified flow diagram of an object model of an automation solution in accordance with the invention.

FIG. 2 depicts a simplified example of an object model of the automation solution of the invention, in which the SIEM system 13 is used. In contrast to the previous notation, the automation solution is here designated as implemented in a plant. The plant includes an engineering station ES (with the planning and engineering software tool 14 depicted in FIG. 1) for configuration of the plant, operator stations OS (corresponding to the operating and observation system 12) for the operation and observation of the plant, and automations AS (with the hardware components of the automation system 2) which regulate or control the technical process. Among other things the field devices are subordinate to the automations, and help to capture and regulate process values. AS, ES, OS and field devices can generate security events (SIEM events) that are received by a SIEM system. The SIEM system determines on the basis of correlation rules what actions should be taken in response to the SIEM events.

Testing of the plant (i.e. the automation solution) is carried out in a simulative environment using a plant simulator—e.g. corresponding to the simulation tool 17 depicted in FIG. 1, such as the Siemens AG SIMIT); the plant, which is to say the process and the hardware components of the automation system 2, including the field devices interacting with the process in the form of a plant model, are thereby virtualized. ES and OS are not, to the greatest possible extent, impacted by the simulation. In order to test not only the automation but also the processing of SIEM events, the resultant actions and the linked responses of the plant, the simulation models of the hardware components of the automation system are, considering by way of example the field devices, expanded with the facility to generate the SIEM events in the simulated environment. And the simulation models running in the simulator are expanded with the facility to receive SIEM events and to transmit them to the SIEM system via a link. In addition to the transmission of SIEM events from the plant simulator to the SIEM system, the actions of the SIEM system in response to the simulated SIEM events can also be received and processed by the plant simulator. The processing of SIEM actions in the plant simulator includes the verification of these actions, in other words whether the SIEM system has responded correctly to the simulated SIEM events, as well as a corresponding visualization for training purposes.

While there have been shown and described and pointed out fundamental novel features of the invention as applied to preferred embodiments thereof, it will be understood that various omissions and substitutions and changes in the form and details of the methods described and devices described and illustrated, and in their operation, may be made by those skilled in the art without departing from the spirit of the invention. It is the intention, therefore, to be limited only as indicated by the scope of the claims appended hereto.

What is claimed is:

1. A planning and engineering method for an automation solution which comprises an automation system and a process engineering plant wherein, when designing and configuring the automation solution, objects that are created and linked by an engineering tool and which represent operable and observable components of the plant and hardware components of the automation system are imported by a simulation tool and the automation solution is simulated using simulation models that are associated with the imported objects, the method comprising the steps of:
    transferring into the simulation models attributes contained in the objects which represent the hardware components, wherein the attributes describe security events that can be generated by the hardware components of the automation system;
    simulatively generating by the simulation models the security events associated with the imported objects of the hardware components of the automation system;
    transferring for evaluation the simulatively generated security events to a Security Information Event Management (SIEM) system;
    utilizing, by the simulation tool, results of the evaluation generated by the STEM system to simulate the automation solution to verify whether the security events associated with the hardware components of the automation system would actually be reported when the automation system or process engineering plant is operating;
    optimizing the automation solution by changing the objects that are created and linked by the engineering tool and which represent operable and observable components of the plant and hardware components of the automation system based on the results of the evaluation generated by the SIEM system; and
    operating and controlling the automation system or process engineering plant based on the optimized automation solution.

2. The planning and engineering method of claim 1, further comprising configuring, by the engineering tool, correlation rules for the evaluation of the security events and transferring the configured correlation rules into the STEM system.

3. The planning and engineering method of claim 1, further comprising configuring, by means of the engineering tool, actions in response to the results of the evaluation of security events and transferring the actions into the STEM system, and using, by the simulation tool, ones of the actions selected by the STEM system as a function of the results in the evaluation of simulated security events to simulate the automation solution.

4. A non-transitory computer readable medium comprising executable instruction for a planning and engineering software tool for an automation solution which comprises an automation system and a process engineering plant, the medium comprising instructions for an engineering tool configured to design and configure the automation solution by generating and linking objects that represent operable and observable components of the plant and hardware components of the automation system, and a simulation tool configured to import the objects and to simulate the automation solution using simulation models associated with the imported objects, the medium further comprising instructions for:
    configuring the engineering software tool to assign attributes to the objects that represent the hardware components, wherein the attributes describe security events that can be generated by the hardware components of the automation system; and
    configuring the simulation tool to transfer the attributes into the simulation models when the objects are imported, to simulatively generate the security events, to transfer for evaluation the simulatively generated security events to a Security Information Event Management (SIEM) system and to use results of the evaluation that are generated by the STEM system to simulate the automation solution to verify whether the security events associated with the hardware components of the automation system would actually be reported when the automation system or process engineering plant is operating;
    optimizing the automation solution by changing the objects that are created and linked by the engineering tool and which represent operable and observable components of the plant and hardware components of the automation system based on the results of the evaluation generated by the STEM system; and
    operating and controlling the automation system or process engineering plant based on the optimized automation solution.

5. The planning and engineering software tool of claim 4, wherein the engineering tool is operable to configure correlation rules for the evaluation of the security events and to transfer the configured correlation rules to the SIEM system.

6. The planning and engineering software tool of claim 4, wherein the engineering tool is operable to configure actions in response to the results of the evaluation of security events and to transfer the configured actions to the SIEM system, and wherein the simulation tool is configured to use ones of the actions that are selected by the SIEM system as a function of the results in the evaluation of simulated security events to simulate the automation solution.

7. A planning and engineering system for an automation solution containing the planning and engineering software tool of claim 4.

8. An automation system for a process engineering plant having the planning and engineering system of claim 7.

9. A computing system comprising:

one or more processors;

a memory storing a program of instructions for a simulation tool for an automation solution which comprises an automation system and a process engineering plant, the simulation tool being configured for, when designing and configuring the automation solution, importing objects that are created and linked by an engineering tool and which represent operable and observable components of the plant and hardware components of the automation system and simulating the automation solution based on simulation models that are associated with the imported objects, wherein the simulation tool is further configured for:

transferring into the simulation models attributes contained in the objects which represent the hardware components, wherein the attributes describe security events that can be generated by the hardware components of the automation system; and simulatively generating the security events, transferring the simulatively generated security events to a Security Information Event Management (STEM) system for evaluation, and using the results of the evaluation generated by the SIEM system to simulate the automation solution to verify whether the security events associated with the hardware components of the automation system would actually be reported when the automation system or process engineering plant is operating;

optimizing the automation solution by changing the objects that are created and linked by the engineering tool and which represent operable and observable components of the plant and hardware components of the automation system based on the results of the evaluation generated by the STEM system; and operating and controlling the automation system or process engineering plant based on the optimized automation solution.

* * * * *